US012645879B2

(12) United States Patent
Cao

(10) Patent No.: US 12,645,879 B2
(45) Date of Patent: Jun. 2, 2026

(54) ENTITY RECOGNITION METHODS AND APPARATUSES, ELECTRONIC DEVICES AND STORAGE MEDIA

(71) Applicant: BOE Technology Group Co., Ltd., Beijing (CN)

(72) Inventor: Pi Cao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 389 days.

(21) Appl. No.: 18/015,512

(22) PCT Filed: Oct. 12, 2021

(86) PCT No.: PCT/CN2021/123266
§ 371 (c)(1),
(2) Date: Jan. 10, 2023

(87) PCT Pub. No.: WO2022/111083
PCT Pub. Date: Jun. 2, 2022

(65) Prior Publication Data
US 2023/0177271 A1     Jun. 8, 2023

(30) Foreign Application Priority Data

Nov. 30, 2020    (CN) .......................... 202011379428.3

(51) Int. Cl.
G06F 40/295          (2020.01)
G06F 16/334          (2025.01)
(Continued)

(52) U.S. Cl.
CPC ........ G06F 40/295 (2020.01); G06F 16/3344 (2019.01); G06F 18/214 (2023.01); G06F 40/242 (2020.01); G06F 40/247 (2020.01)

(58) Field of Classification Search
None
See application file for complete search history.

(56) References Cited

U.S. PATENT DOCUMENTS

2004/0243396 A1* 12/2004 Liu ....................... G06F 40/242
                                                                704/10
2011/0145251 A1     6/2011 Lee et al.
(Continued)

FOREIGN PATENT DOCUMENTS

CN          106934220 A  *  7/2017  ........... G06F 16/288
CN          108491373 A     9/2018
(Continued)

OTHER PUBLICATIONS

Xuan Wang, Yu Zhang, Qi Li, Xiang Ren, Jingbo Shang, Jiawei Han; Distantly Supervised Biomedical Named Entity Recognition with Dictionary Expansion; Nov. 2019; URL: https://ieeexplore.ieee.org/stamp/stamp.jsp?tp=&arnumber=8983212 (Year: 2019).*
(Continued)

*Primary Examiner* — Richa Sonifrank
(74) *Attorney, Agent, or Firm* — IPro, PLLC

(57) ABSTRACT

The present application discloses an entity recognition method, an entity recognition apparatus (110), an electronic device (100) and a readable storage medium. The method includes: acquiring an entity dictionary (S10), where the entity dictionary is compiled according to historical recognition results from an entity recognition model; verifying an entity recognition result from the entity recognition model according to the entity dictionary and a text to be recognized (S20); and in response to determining that a verification result is abnormal, updating the entity dictionary and/or correcting the entity recognition result (S30).

10 Claims, 4 Drawing Sheets

(51) Int. Cl.

| | |
|---|---|
| *G06F 18/214* | (2023.01) |
| *G06F 40/242* | (2020.01) |
| *G06F 40/247* | (2020.01) |

(56)     References Cited

U.S. PATENT DOCUMENTS

| | | | |
|---|---|---|---|
| 2018/0075013 | A1 | 3/2018 | Razack et al. |
| 2019/0392036 | A1* | 12/2019 | O'Connell ........... G06F 40/295 |
| 2021/0004586 | A1* | 1/2021 | Akhondi ............... G06F 40/149 |
| 2021/0174913 | A1* | 6/2021 | Yuan ...................... G16H 10/40 |
| 2022/0188519 | A1* | 6/2022 | Briody ................. G06F 40/295 |
| 2023/0177271 | A1 | 6/2023 | Cao |

FOREIGN PATENT DOCUMENTS

| | | | | |
|---|---|---|---|---|
| CN | 110705258 | A | 1/2020 | |
| CN | 111353311 | A | 6/2020 | |
| CN | 111651990 | A | 9/2020 | |
| CN | 112528659 | A | 3/2021 | |
| KR | 101725354 | B1 * | 4/2017 | ......... G06F 17/2795 |

OTHER PUBLICATIONS

PCT/CN2021/123266 international search report.
PCT/CN2021/123266 Written Opinion.

* cited by examiner

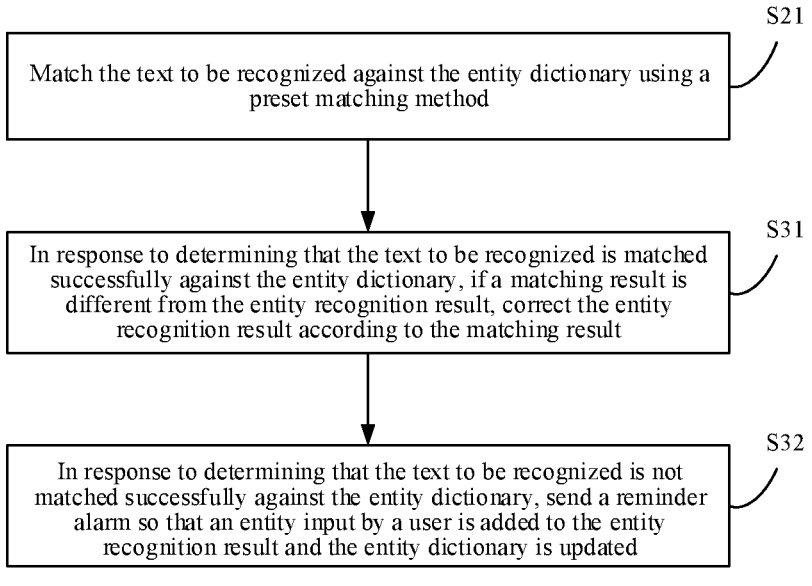

| |
|---|
| Match the text to be recognized against the entity dictionary using a preset matching method |

S21

| |
|---|
| In response to determining that the text to be recognized is matched successfully against the entity dictionary, if a matching result is different from the entity recognition result, correct the entity recognition result according to the matching result |

S31

| |
|---|
| In response to determining that the text to be recognized is not matched successfully against the entity dictionary, send a reminder alarm so that an entity input by a user is added to the entity recognition result and the entity dictionary is updated |

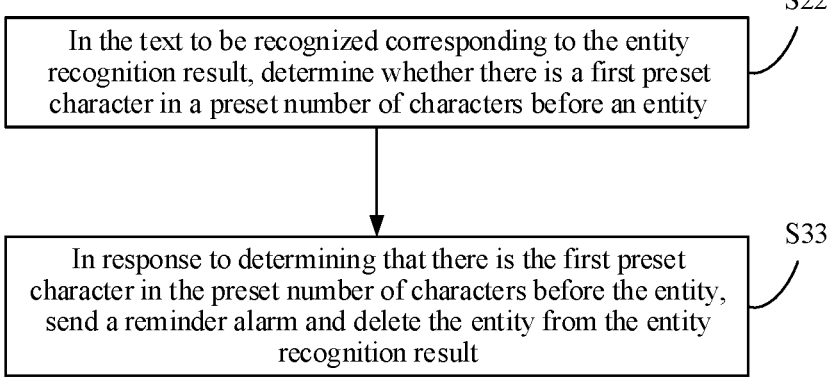

| |
|---|
| In the text to be recognized corresponding to the entity recognition result, determine whether there is a first preset character in a preset number of characters before an entity |

S22

| |
|---|
| In response to determining that there is the first preset character in the preset number of characters before the entity, send a reminder alarm and delete the entity from the entity recognition result |

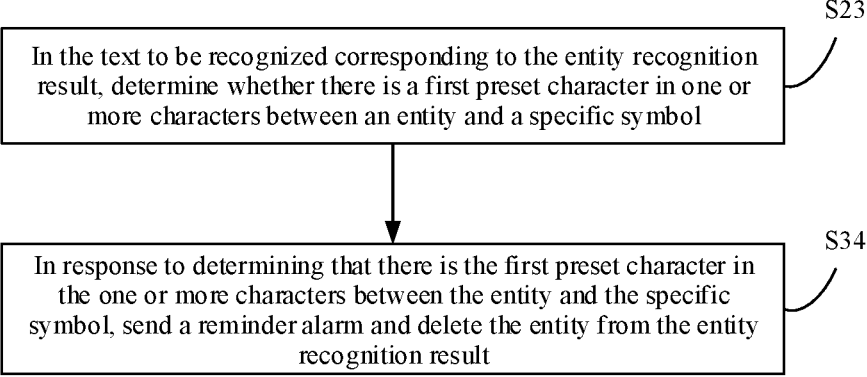

| |
|---|
| In the text to be recognized corresponding to the entity recognition result, determine whether there is a first preset character in one or more characters between an entity and a specific symbol |

S23

| |
|---|
| In response to determining that there is the first preset character in the one or more characters between the entity and the specific symbol, send a reminder alarm and delete the entity from the entity recognition result |

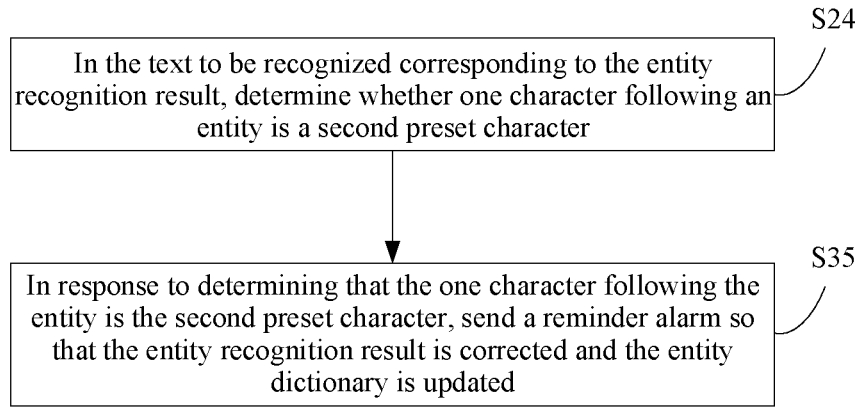

S24

In the text to be recognized corresponding to the entity recognition result, determine whether one character following an entity is a second preset character

S35

In response to determining that the one character following the entity is the second preset character, send a reminder alarm so that the entity recognition result is corrected and the entity dictionary is updated

FIG.8

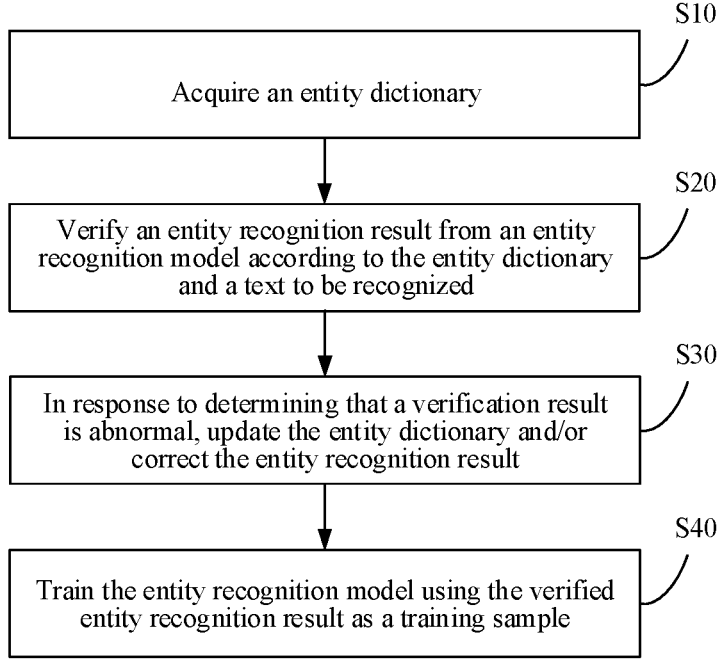

S10

Acquire an entity dictionary

S20

Verify an entity recognition result from an entity recognition model according to the entity dictionary and a text to be recognized

S30

In response to determining that a verification result is abnormal, update the entity dictionary and/or correct the entity recognition result

S40

Train the entity recognition model using the verified entity recognition result as a training sample

FIG.9

ENTITY RECOGNITION METHODS AND APPARATUSES, ELECTRONIC DEVICES AND STORAGE MEDIA

CROSS-REFERENCE TO RELATED APPLICATIONS

This application is a national stage of international PCT Application No. PCT/CN2021/123266 filed on Oct. 12, 2021, which claims priority to and benefit of patent application No. 202011379428.3, filed with the State Intellectual Property Office of China on Nov. 30, 2020, the entire contents of which is incorporated herein by reference.

TECHNICAL FIELD

The present application relates to the field of information processing technology, and in particular, to an entity recognition method, an entity recognition apparatus, an electronic device and a readable storage medium.

BACKGROUND

With the development of natural language processing technology, the natural language processing technology has been applied more and more widely. Named entity recognition is a cornerstone of many natural language processing technologies, such as mapping knowledge domain/knowledge graph and information extraction. In related art, an entity recognition accuracy rate of a single named entity recognition algorithm or a combination of multiple named entity recognition algorithms can reach 85%, but there are still entity recognition omission, errors, etc. in recognition results.

SUMMARY

In view of this, embodiments of the present application provide an entity recognition method, an entity recognition apparatus, an electronic device and a readable storage medium.

The present application provides an entity recognition method, including:

acquiring an entity dictionary, where the entity dictionary is compiled according to historical recognition results from an entity recognition model;

verifying an entity recognition result from the entity recognition model according to the entity dictionary and a text to be recognized; and in response to determining that a verification result is abnormal, updating the entity dictionary and/or correcting the entity recognition result.

In some embodiments, the entity recognition method includes:

numbering the historical recognition results from the entity recognition model;

separating and labeling each of entities in the historical recognition results;

screening the entities to remove one or more duplicate entities and one or more misrecognized entities; and compiling the entity dictionary according to the screened entities.

In some embodiments, verifying the entity recognition result from the entity recognition model according to the entity dictionary and the text to be recognized includes:

matching the text to be recognized against the entity dictionary using a preset matching method; and in response to determining that the verification result is abnormal, updating the entity dictionary and/or correcting the entity recognition result includes:

in response to determining that the text to be recognized is matched successfully against the entity dictionary, if a matching result is different from the entity recognition result, correcting the entity recognition result according to the matching result; and in response to determining that the text to be recognized is not matched successfully against the entity dictionary, sending a reminder alarm so that an entity input by a user is added to the entity recognition result and the entity dictionary is updated.

In some embodiments, verifying the entity recognition result from the entity recognition model according to the entity dictionary and the text to be recognized includes:

in the text to be recognized corresponding to the entity recognition result, determining whether there is a first preset character in a preset number of characters before an entity; and in response to determining that the verification result is abnormal, updating the entity dictionary and/or correcting the entity recognition result includes:

in response to determining that there is the first preset character in the preset number of characters before the entity, sending a reminder alarm and deleting the entity from the entity recognition result.

In some embodiments, verifying the entity recognition result from the entity recognition model according to the entity dictionary and the text to be recognized includes:

in the text to be recognized corresponding to the entity recognition result, determining whether there is a first preset character in one or more characters between an entity and a specific symbol; and in response to determining that the verification result is abnormal, updating the entity dictionary and/or correcting the entity recognition result includes:

in response to determining that there is the first preset character in the one or more characters between the entity and the specific symbol, sending a reminder alarm and deleting the entity from the entity recognition result.

In some embodiments, verifying the entity recognition result from the entity recognition model according to the entity dictionary and the text to be recognized includes:

in the text to be recognized corresponding to the entity recognition result, determining whether one character following an entity is a second preset character; and in response to determining that the verification result is abnormal, updating the entity dictionary and/or correcting the entity recognition result includes:

in response to determining that the one character following the entity is the second preset character, sending a reminder alarm so that the entity recognition result is corrected and the entity dictionary is updated.

In some embodiments, the entity recognition method includes:

training the entity recognition model using the verified entity recognition result as a training sample.

The present application provides an entity recognition apparatus, including:

an acquisition module, configured to acquire an entity dictionary;

a verification module, configured to verify an entity recognition result from an entity recognition model according to the entity dictionary and a text to be recognized; and a correction module, configured to, in response to determining that a verification result is abnormal, update the entity dictionary and/or correct the entity recognition result.

The present application provides an electronic device, including: one or more processors and a memory, where the memory stores a computer program, and the computer program is executed by the processors to implement the steps in the entity recognition method according to any one of the above embodiments.

The present application provides a non-volatile computer readable storage medium storing a computer program, where the computer program is executed by one or more processors to implement the steps in the entity recognition method according to any one of the above embodiments.

For the entity recognition method, the entity recognition apparatus, the electronic device, and the readable storage medium according to the embodiments of the present application, by verifying the entity recognition result from the entity recognition model, and in response to determining that the verification result is abnormal, updating the entity dictionary and/or correcting the entity recognition result, the accuracy of named entity recognition can be improved, the effect of named entity recognition can be enhanced, and in a subsequent recognition process, the error rate of entity recognition can be further reduced and the user experience can be optimized. In addition, accurate recognition can be implemented even for entities like drug ingredients including rare words or special characters in the text.

BRIEF DESCRIPTION OF THE DRAWINGS

The above-described and/or additional aspects and advantages of the present application will become apparent and easy to be understood from the following description of embodiments with reference to the accompanying drawings, in which:

FIG. 5 is a flowchart illustrating an entity recognition method according to some embodiments of the present application.

FIG. 6 is a flowchart illustrating an entity recognition method according to some embodiments of the present application.

FIG. 7 is a flowchart illustrating an entity recognition method according to some embodiments of the present application.

FIG. 8 is a flowchart illustrating an entity recognition method according to some embodiments of the present application.

FIG. 9 is a flowchart illustrating an entity recognition method according to some embodiments of the present application.

DETAILED DESCRIPTION OF THE EMBODIMENTS

Figures 1, 2:
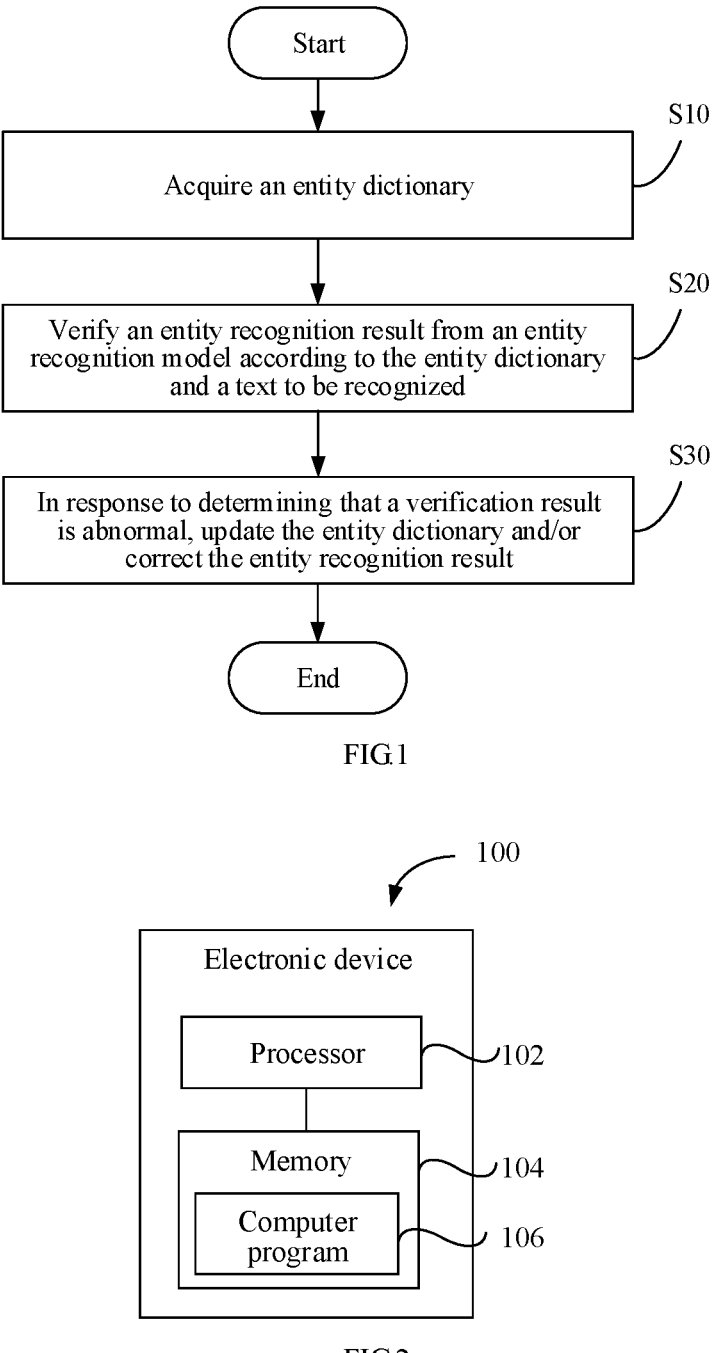
FIG. 1 is a flowchart illustrating an entity recognition method according to some embodiments of the present application.
FIG. 2 is a structural schematic diagram illustrating an electronic device according to some embodiments of the present application.

The embodiments of the present application will be described in detail below, with illustrations thereof represented in the drawings. Like or similar labels throughout the present application refer to like or similar elements or elements with like or similar functions. The embodiments described below with reference to the drawings are exemplary and are intended to be used to explain the present application, but cannot be understood as a limitation on the present application.

Referring to FIG. 1, the present application provides an entity recognition method, including the following steps.

S10, an entity dictionary is acquired.

S20, an entity recognition result from an entity recognition model is verified according to the entity dictionary and a text to be recognized.

S30, in response to determining that a verification result is abnormal, the entity dictionary is updated and/or the entity recognition result is corrected.

Referring to FIG. 2, an embodiment of the present application provides an electronic device 100. The electronic device 100 includes a processor 102 and a memory 104. The memory 104 stores a computer program 106. The processor 102 executes the computer program 106 to perform the following operations: acquiring an entity dictionary; verifying an entity recognition result from an entity recognition model according to the entity dictionary and a text to be recognized; and in response to determining that a verification result is abnormal, updating the entity dictionary and/or correcting the entity recognition result. The processor 104 can be a processor additionally disposed in the electronic device 100 for implementing the entity recognition method, or be a processor of the electronic device 100 itself, which will not be limited in detail.

Figure 3:
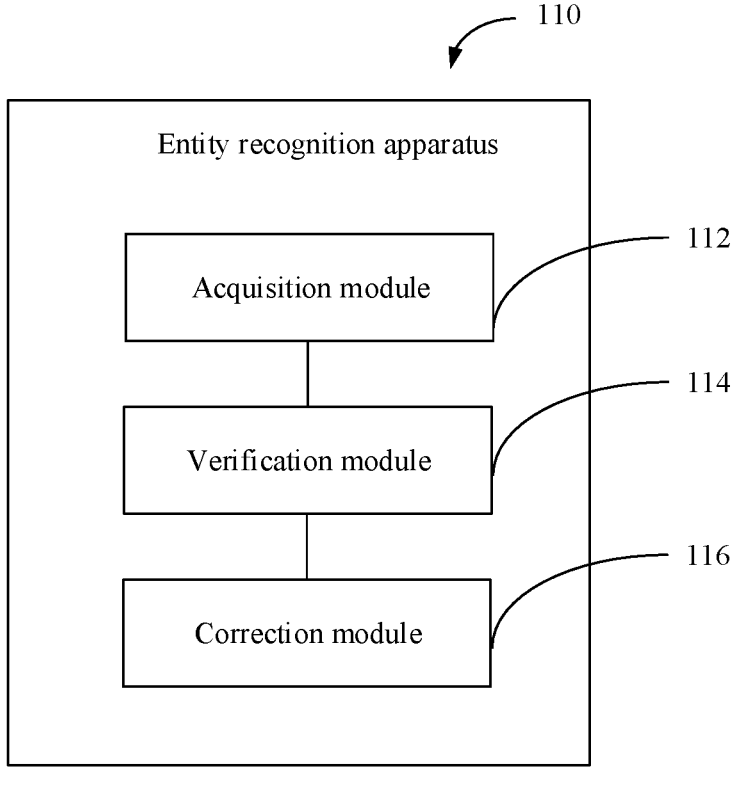
FIG. 3 is a block diagram illustrating an entity recognition apparatus according to some embodiments of the present application.

Refer to FIG. 3, an embodiment of the present application provides an entity recognition apparatus 110. The entity recognition method according to the embodiments of the present application can be implemented by the entity recognition apparatus 110. The entity recognition apparatus 110 includes an acquisition module 112, a verification module 114, and a correction module 116. S10 can be implemented by the acquisition module 112. S20 can be implemented by the verification module 114. S30 can be implemented by the correction module 116. In other words, the acquisition module 112 is configured to acquire an entity dictionary. The verification module 114 is configured to verify an entity recognition result from an entity recognition model according to the entity dictionary and a text to be recognized. The correction module 116 is configured to, in response to determining that a verification result is abnormal, update the entity dictionary and/or correct the entity recognition result.

For the entity recognition method, the entity recognition apparatus 110 and the electronic device 100 according to the embodiments of the present application, by verifying the entity recognition result from the entity recognition model, and in response to determining that the verification result is abnormal, updating the entity dictionary and/or correcting the entity recognition result, the accuracy of named entity recognition can be improved, the effect of named entity recognition can be enhanced, and in a subsequent recognition process, the error rate of entity recognition can be further reduced and the user experience can be optimized. In addition, the entity recognition method, the entity recognition apparatus 110 and the electronic device 100 according to the embodiments of the present application can implement accurate recognition even for entities like drug ingredients including rare words or special characters in the text.

In some other embodiments, after the text to be recognized is recognized by the entity recognition model, an original entity recognition result A is acquired. An entity dictionary compiled in advance according to historical recognition results from the entity recognition model is acquired, and the text to be recognized is recognized using the entity dictionary to acquire an entity recognition result B from the entity dictionary. The original entity recognition result A is verified against the entity recognition result B from the entity dictionary. When the original entity recognition result A is inconsistent with the entity recognition result B from the entity dictionary, that is, when the verification result is abnormal, corresponding correction measures are taken. It can be understood that the correction measures include, but are not limited to, updating the entity dictionary, correcting the entity recognition result, etc., which can be one of the above-described correction measures or a combination of multiple correction measures.

In some other embodiments, the entity recognition result B from the entity dictionary may not be generated, and the entity dictionary and the text to be recognized can be directly used to verify the original entity recognition result A. When the verification result is abnormal, corresponding correction measures are taken. It can be understood that the correction measures include, but are not limited to, updating the entity dictionary, correcting the entity recognition result, etc., which can be one of the above-described correction measures or a combination of multiple correction measures.

In addition, a number of corrections to the entity recognition result is not limited. When the original entity recognition result A is consistent with the entity recognition result B from the entity dictionary, or an entity recognition result Bn from the entity dictionary is consistent with an entity recognition result Bn+1 from the entity dictionary, it is considered that the verification result is not abnormal, and correction measures stop to be taken.

In this way, the accuracy of named entity recognition can be improved, the effect of named entity recognition can be enhanced, and in a subsequent recognition process, the error rate of entity recognition can be further reduced and the user experience can be optimized.

Figure 4:
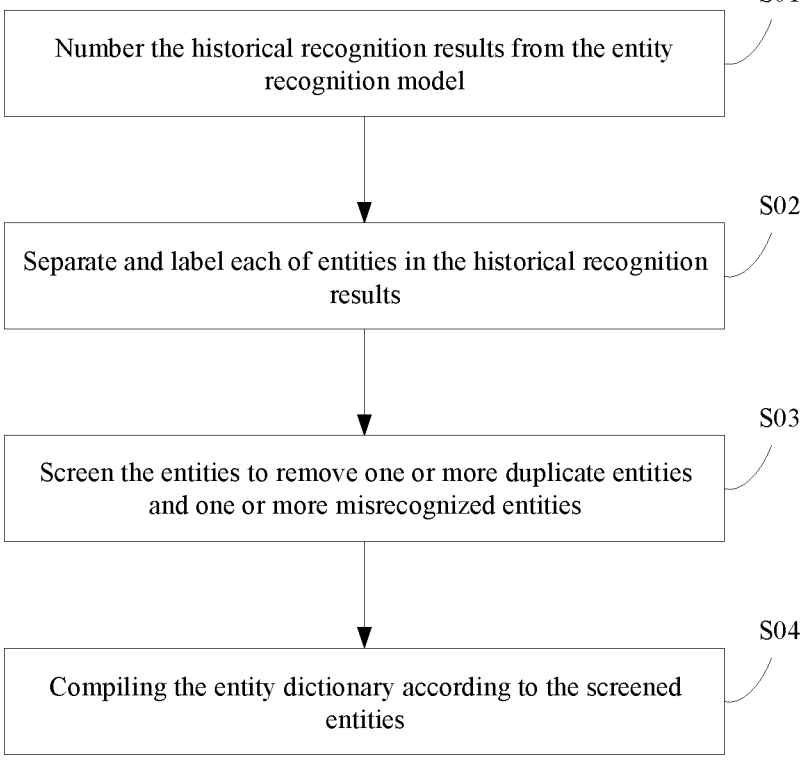
FIG. 4 is a flowchart illustrating an entity recognition method according to some embodiments of the present application.

Referring to FIG. 4, in some embodiments, the entity recognition method includes the following steps.

S01, historical recognition results from the entity recognition model are numbered.

S02, each of entities in the historical recognition results is separated and labeled.

S03, the entities are screened to remove one or more duplicate entities and one or more misrecognized entities.

S04, the entity dictionary is compiled according to the screened entities.

In some embodiments, S01-S04 can be implemented by the acquisition module 112. In other words, the acquisition module 112 is configured to number the historical recognition results from the entity recognition model, separate and label each of entities in the historical recognition results, screen the entities to remove the one or more duplicate entities and the one or more misrecognized entities, and compile the entity dictionary according to the screened entities.

In some embodiments, the processor 102 is configured to number the historical recognition results from the entity recognition model, separate and label each of entities in the historical recognition results, screen the entities to remove the one or more duplicate entities and the one or more misrecognized entities, and compile the entity dictionary according to the screened entities.

In some embodiments, in a process of compiling the entity dictionary, historical recognition results from multiple entity recognition models and their corresponding historical recognition texts are collected, and after the historical recognition texts and the historical recognition results are numbered, each of entities in the historical recognition results is separated and labeled to acquire multiple entities corresponding to their labels. The multiple entities are screened to remove the one or more duplicate entities and the one or more misrecognized entities, and the entity dictionary is compiled according to the screened entities.

In some embodiments, the entity recognition methods according to the embodiments of the present application can be used for entity recognition of drug ingredients. For example, a first group of historical recognition text collected is: q079 # including 125 mg of paracetamol, 7.5 mg of caffeine, 5 mg of artificial bezoar, and 1.5 mg of chlorpheniramine maleate per 10 ml. A historical recognition result corresponding to the historical recognition text q079 is: q079 # paracetamol, caffeine, artificial bezoar, and chlorpheniramine maleate. A second group of historical recognition text is: q080 # including 7.5 mg of caffeine, 10 mg of white granulated sugar, and 20 mg of vitamin C per 10 ml. A historical recognition result corresponding to the historical recognition text q080 is: q080 # caffeine, white granulated sugar, and vimin C.

Each entity in the historical recognition result q079 is separated and labeled to acquire entities: q079q1 paracetamol, q079q2 caffeine, q079q3 artificial bezoar, and q079q4 chlorpheniramine maleate. Each entity in the historical recognition result q080 is separated and labeled to acquire entities: q080q1 caffeine, q080q2 white granulated sugar, and q080q3 vimin C.

The acquired multiple entities are screened. If there are identical entities, only one of the identical entities will be retained to reduce an amount of data in the entity dictionary. It should be noted that, when determining whether the multiple entities are identical entities, it is not necessary to compare labels corresponding to the entities. The historical recognition results and their corresponding recognition texts are numbered and the entities are labeled to facilitate data searching, deletion, correction and other operations during the data processing. In the above embodiments, the entities obtained by separating in the historical recognition results q079 and q080 are screened, and it can be found that q079q2 caffeine and q080q1 caffeine are the identical entities, so that only one "caffeine" is retained.

In this way, in a case of ensuring the diversity of entity types in the entity dictionary, the amount of data in the entity dictionary is reduced, and the data redundancy in the entity dictionary is avoided.

The acquired multiple entities are screened. If there are one or more misrecognized entities, the one or more misrecognized entities are removed to ensure the accuracy of the entity dictionary. In the above embodiments, the entities obtained by separating in the historical recognition results q079 and q080 are screened, and it can be found that q080q3 vitamin C is a misrecognized entity, so that q080q3 vitamin C is removed, and a right entity "vitamin C" is added to the entity dictionary. When the misrecognized entity is detected, the misrecognized entity can be directly corrected, that is, "vitamin C" can be directly corrected to "vitamin C".

In this way, the accuracy of the entity dictionary and the precision of subsequent entity recognition can be ensured, and the diversity of entity types in the entity dictionary can be further ensured.

The entity dictionary is compiled according to the screened entities, the entity dictionary is used to recognize a text to be recognized, and an entity recognition result from the entity recognition model is verified against recognition result based on the entity dictionary. When a verification result is abnormal, the entity dictionary is updated and/or the entity recognition result is corrected. In this way, the accuracy of named entity recognition can be improved, the effect of named entity recognition can be enhanced, and in a subsequent recognition process, the error rate of entity recognition can be further reduced and the user experience can be optimized.

Referring to FIG. 5, in some embodiments, S20 includes:

S21, the text to be recognized is matched against the entity dictionary using a preset matching method.

S30 includes:

S31, in response to determining that the text to be recognized is matched successfully against the entity dictionary, if a matching result is different from the entity recognition result, the entity recognition result is corrected according to the matching result.

S32, in response to determining that the text to be recognized is not matched successfully against the entity dictionary, a reminder alarm is sent so that an entity input by a user is added to the entity recognition result and the entity dictionary is updated.

In some embodiments, S21 can be implemented by the verification module 114. S31 and S32 can be implemented by the correction module 116. In other words, the verification module 114 is configured to match the text to be recognized against the entity dictionary using the preset matching method. The correction module 116 is configured to, in response to determining that the text to be recognized is matched successfully against the entity dictionary, if the matching result is different from the entity recognition result, correct the entity recognition result according to the matching result, and in response to determining that the text to be recognized is not matched successfully against the entity dictionary, send the reminder alarm so that the entity input by the user is added to the entity recognition result and the entity dictionary is updated.

In some embodiments, the processor 102 is configured to match the text to be recognized against the entity dictionary using the preset matching method, and further configured to, in response to determining that the text to be recognized is matched successfully against the entity dictionary, if the matching result is different from the entity recognition result, correct the entity recognition result according to the matching result, and in response to determining that the text to be recognized is not matched successfully against the entity dictionary, send the reminder alarm so that the entity input by the user is added to the entity recognition result and the entity dictionary is updated.

In some embodiments, after the text to be recognized is recognized by the entity recognition model, the original entity recognition result A is acquired. The entity dictionary compiled in advance according to the historical recognition results from the entity recognition model is acquired, and the text to be recognized is matched against the entity dictionary using the preset matching method to acquire the entity recognition result B from the entity dictionary. The original entity recognition result A is verified against the entity recognition result B from the entity dictionary to determine whether there is entity recognition omission in the original entity recognition result A. The entity recognition omission includes cases in which an entity recognition result is incomplete and an entity recognition result is null.

In some embodiments, the text to be recognized is: q866 # this product includes benorilate, vitamin, etc. The original entity recognition result A from the entity recognition model is: q866 # vitamin. The matching result is: q866 # benorilate and vitamin. The matching result is the entity recognition result B from the entity dictionary. In this case, the original entity recognition result A is incomplete. Since the text to be recognized is matched successfully against the entity dictionary and the matching result is generated, it can be considered that there are one or more entities corresponding to the text to be recognized in the entity dictionary, and the entity dictionary does not need to be updated. However, since the matching result is inconsistent with the original entity recognition result A and there are more entities in the matching result than that in the original entity recognition result A, it can be considered that the original entity recognition result A is incomplete, and the original entity recognition result A is corrected according to the matching result.

In the embodiments, if the matching result is consistent with the original entity recognition result A, it can be considered that the original entity recognition result A is right, and the original entity recognition result A does not need to be corrected.

In some other embodiments, the text to be recognized is: q866 # this product includes benorilate, vitamin, etc. The original entity recognition result A from the entity recognition model is: q866 #. In this case, the original entity recognition result A is null. The entity recognition result B is q866 # benorilate, vitamin. The matching result is: q866 # benorilate and vitamin. The matching result is the entity recognition result B from the entity dictionary. Since the text to be recognized is matched successfully against the entity dictionary and the matching result is generated, it can be considered that there are one or more entities corresponding to the text to be recognized in the entity dictionary, and the entity dictionary does not need to be updated. The original entity recognition result A is corrected according to the entity recognition result B.

In some other embodiments, the text to be recognized is: q866 # this product includes benorilate, vitamin, etc. The entity recognition result B is q866 #. In this case, the text to be recognized is not matched successfully against the entity dictionary, it can be considered that there is no entity corresponding to the text to be recognized in the entity dictionary, and a reminder alarm is sent so as to inform a user to manually add the entity corresponding to the text to be recognized, the entity inputted by the user is added to the entity recognition result B from the entity dictionary, and the entity is added to the entity dictionary to update the entity dictionary.

In some other embodiments, the text to be recognized is: q866 # this product includes benorilate, vitamin, etc. The entity recognition result B is q866 # benorilate or q866 # vitamin. In this case, the text to be recognized is not completely matched successfully against the entity dictionary, it can be considered that there is no part of entity corresponding to the text to be recognized in the entity dictionary, and a reminder alarm is sent so as to inform a user to manually add the omitted entity, the entity inputted by the user is added to the entity recognition result B from the entity dictionary, and the entity is added to the entity dictionary to update the entity dictionary.

In this way, when the verification result is abnormal, the entity dictionary can be updated and/or the entity recognition result can be corrected. The accuracy of named entity recognition can be improved, the effect of named entity recognition can be enhanced, and in the subsequent recognition process, the error rate of entity recognition can be further reduced and the user experience can be optimized.

It should be noted that the preset matching method can be provided according to attributes, applicable scenes, and other parameters of the entity recognition model, which will not be limited in detail. For example, the preset matching method may be a forward maximum matching algorithm, a reverse maximum matching algorithm, or a bidirectional matching algorithm.

Referring to FIG. 6, in some embodiments, S20 includes:

S22, in the text to be recognized corresponding to the entity recognition result, it is determined whether there is a first preset character in a preset number of characters before an entity.

S30 includes:

S33, in response to determining that there is the first preset character in the preset number of characters before the entity, a reminder alarm is sent and the entity is deleted from the entity recognition result.

In some embodiments, S22 can be implemented by the verification module 114. S33 can be implemented by the correction module 116. In other words, the verification module 114 is configured to, in the text to be recognized corresponding to the entity recognition result, determine whether there is the first preset character in the preset number of characters before the entity. The correction module 116 is configured to, in response to determining that there is the first preset character in the preset number of characters before the entity, send the reminder alarm and delete the entity from the entity recognition result.

In some embodiments, the processor 102 is configured to, in the text to be recognized corresponding to the entity recognition result, determine whether there is the first preset character in the preset number of characters before the entity, and in response to determining that there is the first preset character in the preset number of characters before the entity, send the reminder alarm and delete the entity from the entity recognition result.

In some embodiments, in some scenes, the text to be recognized may include a mixture of entities and non-entities, such as a mixture of words and special characters. In a text to be recognized of medicine, there are parentheses, dash, slash, and other special characters in chemical names of some drug ingredients. These special characters belong to non-entities, which may not be recognized in an entity recognition process, thereby resulting in errors in the entity recognition result. Therefore, in the text to be recognized corresponding to the entity recognition result, it is determined whether there is the first preset character in the preset number of characters before the entity. In response to determining that there is the first preset character in the preset number of characters before the entity, the reminder alarm is sent and the corresponding entity is deleted from the entity recognition result. The first preset character may be one or more of parentheses, dash, slash, and other special characters. The preset number may be set according to actual applicable scenes, empirical values in the art, and other parameters, which will not be limited in detail.

In some embodiments, the text to be recognized is: q900 # this product includes roxithromycin as a main ingredient, whose chemical name is: 9-[O-[(2-methoxyethoxy)-methyl] oxime]erythromycin. The original entity recognition result A from the entity recognition model is: q900 # roxithromycin and erythromycin. In this case, since there are multiple first preset characters in the preset number of characters before "erythromycin", a reminder alarm is sent so as to inform a user of deleting "erythromycin" from the original entity recognition result A, thus removing a misrecognized result.

It should be noted that, in a case where there is one first preset character or there are multiple first preset characters in the preset number of characters before the entity, an alarm is sent so as to remind a user to correct the entity recognition result.

In this way, when there are one or more non-entities in the text to be recognized, the entity recognition result can be corrected in time. The accuracy of named entity recognition can be improved, the effect of named entity recognition can be enhanced, and in the subsequent recognition process, the error rate of entity recognition can be further reduced and the user experience can be optimized. The entity recognition method, the entity recognition apparatus 110 and the electronic device 100 according to the embodiments of the present application can implement accurate recognition even for entities like drug ingredients including rare words or special characters in the text.

In some embodiments, it can be determined whether there is the first preset character in the preset number of characters before the entity through a regular expression. In this way, the accuracy of named entity recognition can be improved, the effect of named entity recognition can be enhanced, and the user experience can be optimized.

Referring to FIG. 7, in some embodiments, S20 includes:

S23, in the text to be recognized corresponding to the entity recognition result, it is determined whether there is a first preset character in one or more characters between an entity and a specific symbol.

S30 includes:

S34, in response to determining that there is the first preset character in the one or more characters between the entity and the specific symbol, a reminder alarm is sent and the entity is deleted from the entity recognition result.

In some embodiments, S23 can be implemented by the verification module 114. S34 can be implemented by the correction module 116. In other words, the verification module 114 is configured to, in the text to be recognized corresponding to the entity recognition result, determine whether there is the first preset character in the one or more characters between the entity and the specific symbol. The correction module 116 is configured to, in response to determining that there is the first preset character in the one or more characters between the entity and the specific symbol, send the reminder alarm and delete the entity from the entity recognition result.

In some embodiments, the processor 102 is configured to, in the text to be recognized corresponding to the entity recognition result, determine whether there is the first preset character in the one or more characters between the entity and the specific symbol, and further configured to, in response to determining that there is the first preset character in the one or more characters between the entity and the specific symbol, send the reminder alarm and delete the entity from the entity recognition result.

In some embodiments, in some texts to be recognized including a mixture of words and specific symbols, the first preset character may exist between the entity and the specific symbol. It is determined whether there is the first preset character in the one or more characters between the entity and the specific symbol, and in response to determining that there is the first preset character in the one or more characters between the entity and the specific symbol, the reminder alarm is sent and the corresponding entity is deleted from the entity recognition result. In this way, when there are one or more non-entities in the text to be recognized, the entity recognition result can be corrected in time. The accuracy of named entity recognition can be improved, the effect of named entity recognition can be enhanced, and in the subsequent recognition process, the error rate of entity recognition can be further reduced and the user experience can be optimized. The entity recognition method, the entity recognition apparatus 110 and the electronic device 100 according to the embodiments of the present application can implement accurate recognition even for entities like drug ingredients including rare words or special characters in the text.

It can be understood that the first preset character herein represents the same meaning as the first preset character in the preceding embodiments, and may be one or more of parentheses, dash, slash, and other special characters. The specific symbol may be colon, semicolon, question mark, pause, comma, space and other symbols.

In some embodiments, the text to be recognized is: q900 # this product includes roxithromycin as a main ingredient, whose chemical name is: 9-[O-[(2-methoxyethoxy)-methyl] oxime]erythromycin. The original entity recognition result A from the entity recognition model is: q900 # roxithromy-cin and erythromycin. In this case, since there are multiple first preset characters between "erythromycin" and the spe-cific symbol ":", a reminder alarm is sent so as to inform a user of deleting "erythromycin" from the original entity recognition result A, thus removing a misrecognized result.

It should be noted that, in a case where there is one first preset character between the entity and the specific symbol or there are multiple first preset characters between the entity and the specific symbol, an alarm is sent so as to remind a user to correct the entity recognition result.

In this way, when there are one or more non-entities in the text to be recognized, the entity recognition result can be corrected in time. The accuracy of named entity recognition can be improved, the effect of named entity recognition can be enhanced, and in the subsequent recognition process, the error rate of entity recognition can be further reduced and the user experience can be optimized. The entity recognition method, the entity recognition apparatus 110 and the elec-tronic device 100 according to the embodiments of the present application can implement accurate recognition even for entities like drug ingredients including rare words or special characters in the text.

In some embodiments, it can be determined whether there is the first preset character in the preset number of characters before the entity through a regular expression. In this way, the accuracy of named entity recognition can be improved, the effect of named entity recognition can be enhanced, and the user experience can be optimized.

Referring to FIG. 8, in some embodiments, S20 includes:

S24, in the text to be recognized corresponding to the entity recognition result, it is determined whether one character following an entity is a second preset char-acter.

S30 includes:

S35, in response to determining that the one character following the entity is the second preset character, a reminder alarm is sent so that the entity recognition result is corrected and the entity dictionary is updated.

In some embodiments, S24 can be implemented by the verification module 114. S35 can be implemented by the correction module 116. In other words, the verification module 114 is configured to, in the text to be recognized corresponding to the entity recognition result, determine whether one character following the entity is the second preset character. The correction module 116 is configured to, in response to determining that the one character following the entity is the second preset character, send the reminder alarm so that the entity recognition result is corrected and the entity dictionary is updated.

In some embodiments, the processor 102 is configured to, in the text to be recognized corresponding to the entity recognition result, determine whether one character follow-ing the entity is the second preset character, and further configured to, in response to determining that the one character following the entity is the second preset character, send the reminder alarm so that the entity recognition result is corrected and the entity dictionary is updated.

In some embodiments, in the original entity recognition result A from the entity recognition model, an entity may be only partly recognized, but cannot be recognized rightly. In this case, in the text to be recognized corresponding to the entity recognition result, it is determined whether one char-acter following the entity is the second preset character, and in response to determining that the one character following the entity is the second preset character, the reminder alarm is sent so that the entity recognition result is corrected and the entity dictionary is updated. The second preset character may be a Chinese character, an English character, a Japanese character, and other characters in multiple languages, which can be provided in detail according to use scenes and actual needs, and will not be limited here.

In some embodiments, the second preset character can be a Chinese character, and the text to be recognized is: q783 # cefterampivoxil. The original entity recognition result A from the entity recognition model is: q783 # cef. In this case, the entity recognition model fails to accurately recognize the entity in the text to be recognized. By determining whether one character following the entity in the text to be recog-nized is the second preset character, a misrecognized entity is screened out, and an alarm is sent so as to remind a user to correct the entity recognition result. The corrected entity recognition result is: q783 # cefterampivoxil. The entity dictionary is updated according to the corrected entity recognition result.

In this way, the entity recognition result can be corrected in time. The accuracy of named entity recognition can be improved, the effect of named entity recognition can be enhanced, and in the subsequent recognition process, the error rate of entity recognition can be further reduced and the user experience can be optimized. The entity recognition method, the entity recognition apparatus 110 and the elec-tronic device 100 according to the embodiments of the present application can implement accurate recognition even for entities like drug ingredients including rare words or special characters in the text.

In some embodiments, it can be determined whether one character following the entity is the second preset character through a regular expression. For example, it can be deter-mined whether there is a Chinese character in the one or more characters after the entity in the text to be recognized through the regular expression [\u4e00-\u9fa5]. In this way, the accuracy of named entity recognition can be improved, the effect of named entity recognition can be enhanced, and the user experience can be optimized.

Referring to FIG. 9, in some embodiments, the entity recognition method includes:

S40, the entity recognition model is trained using the verified entity recognition result as a training sample.

In some embodiments, S40 can be implemented by the correction module 116. In other words, the correction mod-ule 116 is configured to train the entity recognition model using the verified entity recognition result as the training sample.

In some embodiments, the processor 102 is configured to train the entity recognition model using the verified entity recognition result as the training sample.

In some embodiments, after the entity recognition result is verified, the entity recognition result can be directly used as a recognition result for subsequent application, or the entity recognition result can be used as a training sample to train the entity recognition model.

In this way, the accuracy of named entity recognition can be further improved, and the effect of named entity recognition can be enhanced An embodiment of the present application provides a non-volatile computer readable storage medium having a computer program stored thereon, where the computer program is executed by one or more processors to implement the steps in the entity recognition method according to any one of the above embodiments.

Those of ordinary skill in the art can understand that all or part of procedures for implementing the methods in the above embodiments can be completed by a computer program to instruct relevant hardware. The program can be stored in a non-volatile computer readable storage medium. During execution of the program, procedures described in the above method embodiments can be included. The storage medium may be: a magnetic disk, an optical disk, a Read-Only Memory (ROM), etc.

Only several examples of the present application are described in the above embodiments, and their description is more specific and detailed, but cannot be understood as a limitation on the patent scope of the application. It should be pointed out that, for those of ordinary skill in the art, some variations and improvements can be made without departing from the concept of the present application, and those variations and improvements fall within the protection scope of the present application. Therefore, the protection scope of the patent application shall be subject to the appended claims.

The invention claimed is:

1. An entity recognition method, comprising:
acquiring an entity dictionary, wherein the entity dictionary is compiled according to historical recognition results from an entity recognition model;
verifying an entity recognition result from the entity recognition model according to the entity dictionary and a text to be recognized; and
in response to determining that a verification result is abnormal, updating the entity dictionary and/or correcting the entity recognition result;
wherein verifying the entity recognition result from the entity recognition model according to the entity dictionary and the text to be recognized comprises:
in the text to be recognized corresponding to the entity recognition result, determining whether there is a first preset character in one or more characters between an entity and a specific symbol, and determining whether one character following an entity is a second preset character; wherein the first preset character comprises one or more of parentheses, dash, or slash, and the second preset character comprises a Chinese character, an English character and a Japanese character, and wherein the specific symbol comprises a colon, a semicolon, a question mark, a pause, a comma, and a space; and
wherein in response to determining that the verification result is abnormal, updating the entity dictionary and/or correcting the entity recognition result comprises:

in response to determining that there is the first preset character in the one or more characters between the entity and the specific symbol, sending a reminder alarm and deleting the entity from the entity recognition result; and
in response to determining that the one character following the entity is the second preset character, sending a reminder alarm so that the entity recognition result is corrected and the entity dictionary is updated;
wherein verifying the entity recognition result from the entity recognition model according to the entity dictionary and the text to be recognized further comprises:
matching the text to be recognized against the entity dictionary using a preset matching method; and
in response to determining that the verification result is abnormal, updating the entity dictionary and/or correcting the entity recognition result further comprises:
in response to determining that the text to be recognized is matched successfully against the entity dictionary, if a matching result is different from the entity recognition result, correcting the entity recognition result according to the matching result; and
in response to determining that the text to be recognized is not matched successfully against the entity dictionary, sending a reminder alarm so that an entity input by a user is added to the entity recognition result and the entity dictionary is updated;
numbering the historical recognition results from the entity recognition model;
separating and labeling each of entities in the historical recognition results;
screening the entities to remove one or more duplicate entities and one or more misrecognized entities; and
compiling the entity dictionary according to the screened entities.

2. The entity recognition method according to claim 1, wherein verifying the entity recognition result from the entity recognition model according to the entity dictionary and the text to be recognized comprises:
in the text to be recognized corresponding to the entity recognition result, determining whether there is a first preset character in a preset number of characters before an entity; and
in response to determining that the verification result is abnormal, updating the entity dictionary and/or correcting the entity recognition result comprises:
in response to determining that there is the first preset character in the preset number of characters before the entity, sending a reminder alarm and deleting the entity from the entity recognition result.

3. The entity recognition method according to claim 1, further comprising:
training the entity recognition model using the verified entity recognition result as a training sample.

4. An electronic device, comprising: one or more processors and a memory, wherein the memory stores a computer program, and the computer program is executed by the processors to implement operations comprising:
acquiring an entity dictionary, wherein the entity dictionary is compiled according to historical recognition results from an entity recognition model;
verifying an entity recognition result from the entity recognition model according to the entity dictionary and a text to be recognized; and
in response to determining that a verification result is abnormal, updating the entity dictionary and/or correcting the entity recognition result;

wherein verifying the entity recognition result from the entity recognition model according to the entity dictionary and the text to be recognized comprises:

in the text to be recognized corresponding to the entity recognition result, determining whether there is a first preset character in one or more characters between an entity and a specific symbol, and determining whether one character following an entity is a second preset character, wherein the first preset character comprises one or more of parentheses, dash, or slash, and the second preset character comprises a Chinese character, an English character and a Japanese character, and wherein the specific symbol comprises a colon, a semicolon, a question mark, a pause, a comma, and a space; and wherein in response to determining that the verification result is abnormal, updating the entity dictionary and/or correcting the entity recognition result comprises:

in response to determining that there is the first preset character in the one or more characters between the entity and the specific symbol, sending a reminder alarm and deleting the entity from the entity recognition result; and in response to determining that the one character following the entity is the second preset character, sending a reminder alarm so that the entity recognition result is corrected and the entity dictionary is updated;

wherein verifying the entity recognition result from the entity recognition model according to the entity dictionary and the text to be recognized further comprises:

matching the text to be recognized against the entity dictionary using a preset matching method; and in response to determining that the verification result is abnormal, updating the entity dictionary and/or correcting the entity recognition result further comprises:

in response to determining that the text to be recognized is matched successfully against the entity dictionary, if a matching result is different from the entity recognition result, correcting the entity recognition result according to the matching result; and in response to determining that the text to be recognized is not matched successfully against the entity dictionary, sending a reminder alarm so that an entity input by a user is added to the entity recognition result and the entity dictionary is updated wherein the operations further comprise: receiving a text to be recognized including a drug ingredient; and using the entity dictionary to recognize the drug ingredient.

5. A non-volatile computer readable storage medium storing a computer program, wherein the computer program is executed by one or more processors to implement operations comprising:

acquiring an entity dictionary, wherein the entity dictionary is compiled according to historical recognition results from an entity recognition model;

verifying an entity recognition result from the entity recognition model according to the entity dictionary and a text to be recognized; and in response to determining that a verification result is abnormal, updating the entity dictionary and/or correcting the entity recognition result;

wherein verifying the entity recognition result from the entity recognition model according to the entity dictionary and the text to be recognized comprises:

in the text to be recognized corresponding to the entity recognition result, determining whether there is a first preset character in one or more characters between an entity and a specific symbol, and determining whether one character following an entity is a second preset character, wherein the first preset character comprises one or more of parentheses, dash, or slash, and the second preset character comprises a Chinese character, an English character and a Japanese character, and wherein the specific symbol comprises a colon, a semicolon, a question mark, a pause, a comma, and a space;

wherein in response to determining that the verification result is abnormal, updating the entity dictionary and/or correcting the entity recognition result comprises:

in response to determining that there is the first preset character in the one or more characters between the entity and the specific symbol, sending a reminder alarm and deleting the entity from the entity recognition result; and in response to determining that the one character following the entity is the second preset character, sending a reminder alarm so that the entity recognition result is corrected and the entity dictionary is updated;

wherein verifying the entity recognition result from the entity recognition model according to the entity dictionary and the text to be recognized further comprises:

matching the text to be recognized against the entity dictionary using a preset matching method; and in response to determining that the verification result is abnormal, updating the entity dictionary and/or correcting the entity recognition result further comprises:

in response to determining that the text to be recognized is matched successfully against the entity dictionary, if a matching result is different from the entity recognition result, correcting the entity recognition result according to the matching result; and in response to determining that the text to be recognized is not matched successfully against the entity dictionary, sending a reminder alarm so that an entity input by a user is added to the entity recognition result and the entity dictionary is updated wherein the operations further comprise: receiving a text to be recognized including a drug ingredient; and using the entity dictionary to recognize the drug ingredient.

6. The electronic device according to claim 4, wherein verifying the entity recognition result from the entity recognition model according to the entity dictionary and the text to be recognized comprises:

in the text to be recognized corresponding to the entity recognition result, determining whether there is a first preset character in a preset number of characters before an entity; and in response to determining that the verification result is abnormal, updating the entity dictionary and/or correcting the entity recognition result comprises:

in response to determining that there is the first preset character in the preset number of characters before the entity, sending a reminder alarm and deleting the entity from the entity recognition result.

7. The electronic device according to claim 4, operations further comprise:

training the entity recognition model using the verified entity recognition result as a training sample.

8. The storage medium according to claim 5, wherein verifying the entity recognition result from the entity recognition model according to the entity dictionary and the text to be recognized comprises:

in the text to be recognized corresponding to the entity recognition result, determining whether there is a first preset character in a preset number of characters before an entity; and in response to determining that the verification result is abnormal, updating the entity dictionary and/or correcting the entity recognition result comprises:

in response to determining that there is the first preset character in the preset number of characters before the entity, sending a reminder alarm and deleting the entity from the entity recognition result.

9. The electronic device according to claim 4, the operations further comprise:

numbering the historical recognition results from the entity recognition model;

separating and labeling each of entities in the historical recognition results;

screening the entities to remove one or more duplicate entities and one or more misrecognized entities; and compiling the entity dictionary according to the screened entities.

10. The storage medium according to claim 5, the operations further comprise:

numbering the historical recognition results from the entity recognition model;

separating and labeling each of entities in the historical recognition results;

screening the entities to remove one or more duplicate entities and one or more misrecognized entities; and compiling the entity dictionary according to the screened entities.

\* \* \* \* \*